United States Patent
Messina et al.

(10) Patent No.: US 7,257,275 B2
(45) Date of Patent: Aug. 14, 2007

(54) PROCESSING METHOD FOR OBTAINING A HIGH RESOLUTION DIGITAL IMAGE

(75) Inventors: Giuseppe Messina, Giardini Naxos (IT); Massimo Mancuso, Monza (IT); Sebastiano Battiato, Acicatena (IT)

(73) Assignee: STMicroelectronics S.r.l., Agrate Brianza (IL)

( * ) Notice: Subject to any disclaimer, the term of this patent is extended or adjusted under 35 U.S.C. 154(b) by 956 days.

(21) Appl. No.: 10/457,841

(22) Filed: Jun. 9, 2003

(65) Prior Publication Data

US 2004/0032511 A1    Feb. 19, 2004

(30) Foreign Application Priority Data

Jun. 12, 2002   (EP)   .................................. 02425382

(51) Int. Cl.
*G06K 9/32* (2006.01)
(52) U.S. Cl. ...................................... 382/299
(58) Field of Classification Search ........ 382/298–300, 382/254, 107, 284, 294, 236, 162; 348/222.1, 348/272–273, 218.1, 36–39, 584; 358/514, 358/540, 1.9, 525; 345/606
See application file for complete search history.

(56) References Cited

FOREIGN PATENT DOCUMENTS

WO    01/26359    4/2001

OTHER PUBLICATIONS

Irani et al., *Super Resolution from Image Sequences*, Proceedings of the International Conference on Pattern Recognition, Atlantic City, Jun. 16-21, 1990, Conference A: Computer Vision and Conference B: Pattern Recognition Systems and Applications, Los Alamitos, IEEE Comp., Soc. Press, US, vol. 1, conf. 10, Jun. 16, 1990, pp. 115-120, XP010020478.
Patent Abstracts of Japan, vol. 2002, No. 03, Apr. 3, 2002 & JP 2001 309229 A, Nov. 2, 2001.
Patent Abstracts of Japan, vol. 2000, No. 15, Apr. 6, 2001 & JP 2000 350225 A, Dec. 15, 2000.
Patent Abstracts of Japan, vol. 1998, No. 04, Mar. 31, 1998 & JP 09 322070 A, Dec. 12, 1997.

*Primary Examiner*—Ishrat Sherali
(74) *Attorney, Agent, or Firm*—Lisa K. Jorgenson; Allen, Dyer, Doppelt, Milbrath & Gilchrist, P.A.

(57) ABSTRACT

A method for obtaining a high resolution digital image from a plurality of starting images formed by pixel matrices and acquired at a lower resolution is provided. The method may include combining the plurality of starting images to generate a provisional high resolution image formed by a pixel matrix. The method may also include associating a respective error with at least a part of the pixels of the provisional image $HR^{(o)}$. More particularly, this may include providing a first error associated with at least one first pixel, and at least partially processing the provisional image by modifying the pixels of this image based upon the respective errors associated therewith. A second error may also be calculated to associate with at least one second pixel situated in the vicinity of the first pixel in the matrix ($HR^{(o)}$). The second error may be calculated by using the first error associated with the at least one first pixel.

37 Claims, 6 Drawing Sheets

PROCESSING METHOD FOR OBTAINING A HIGH RESOLUTION DIGITAL IMAGE

FIELD OF THE INVENTION

The present invention relates to the acquisition and processing of digital images and, more particularly, to a method for obtaining high resolution images by processing several low resolution images representing the same real scene.

BACKGROUND OF THE INVENTION

Digital images are currently used in many different applications. For example, new-generation acquisition devices, such as digital still cameras (DSCs), are commonly used for capturing such images. The availability of sensors of ever greater resolution and low-cost, low-consumption digital signal processors (DSPs) has led to considerable commercial availability of digital still cameras. Yet, it may still be relatively expensive to produce devices that are capable of capturing high-quality digital images.

The quality of an image depends substantially on the characteristics of the sensor with which the image is acquired. This is particularly true for image resolution. The sensor, which in digital still cameras is typically either a charge coupled device (CCD) sensor or a complementary metal oxide semiconductor (CMOS) sensor, is an integrated circuit including a matrix of photosensitive cells or elements, each associated with a corresponding pixel. When the image is acquired from a real scene, each cell produces an electric signal proportional to the light that strikes it. More particularly, each cell responds to the radiance (i.e., emitted quantity of light) of a particular portion of the real scene. This portion is the receptive field of the pixel.

The larger the number of photosensitive cells or the greater the spatial resolution of the sensor (which provide the same result), the denser the information relating to the real scene captured in the acquisition process will be. But the choice of obtaining a higher image resolution by increasing the sensor resolution in terms of number of pixels is not always feasible for reasons that are both technological and economic in nature.

Moreover, when acquiring a digital photograph a sensor, no matter how good its resolution, will always produce an approximation of the scene that is to be captured. Further, the photosensitive cells of the sensor are always separated by a certain distance. This is because not all the sensor area can be uniformly covered with photosensitive elements, and technological reasons make it inevitable that there will be a certain minimum distance between adjacent cells. This spacing is the cause of a first loss of information in the acquisition process.

Another reason why a digital image acquired with a digital still camera sensor provides only an approximation of the real scene is a result of the interpolation process for processing the data acquired by the sensor. As is well known, a digital image may be represented by a matrix of elements (i.e., pixels) corresponding to elementary portions of the image. Each of these elements has associated with it one or more digital values representing the optical components. In a monochromatic image, for example, only a single digital value is associated with each pixel. In this case, the image is made up of only a single channel or plane.

On the other hand, in a color image (which may be in red green blue (RGB) format, for example) each pixel has associated therewith three digital values that correspond, respectively, to the three components (red, green, blue) of the additive chromatic synthesis. In this case the image can be broken down into three distinct planes, each including the information relating to just one of the chromatic components.

A typical sensor will dedicate a single and substantially monochromatic photosensitive cell to each pixel of the image. Furthermore, the sensor is provided with an optical filter including a matrix of filtering elements, each of which covers one photosensitive cell. Subject to a minimal absorption, each filtering element transmits to the photosensitive cell with which it is associated the luminous radiation corresponding solely to the wavelength of the red light, green light, or blue light. Thus, for each pixel only one of the three primary components (R,G,B) of the additive chromatic synthesis is avilable.

The type of filter used varies from one manufacturer to the next. Perhaps the most common of these filter is the Bayer filter. With this filter, the arrangement of the filtering elements is in the "Bayer" pattern, which is shown in the element matrix 10 illustrated in FIG. 2. The electric signals produced by the photosensitive cells are converted into digital values in accordance with conventional methodologies. The digital image obtained in this manner is incomplete. This is because the image is made up of only a single component (R, G or B) for each pixel. The format of this image is conventionally referred to as a color filter array (CFA).

The CFA image is then subjected to a complex reconstruction process to produce a "complete" image (e.g., in RGB format) in which three digital values will be associated with each pixel. This reconstruction implies a passage from a representation of the image in a single plane (Bayer plane) to a representation in three planes (R,G,B). The reconstruction is accomplished through known interpolation algorithms.

It should be noted that the interpolation produces only an approximation of the image that would be obtained with a sensor capable of acquiring three optical components per pixel. In this sense, therefore, the interpolation process introduces yet another approximation into the acquired image.

Given these limitations of the quality of the acquired image introduced by the sensor characteristics and the interpolation process, it is often necessary to perform further processing operations to obtain a high resolution digital image. To this end prior art proposes numerous processing methods. These are generally based on the principle of reconstructing the original information of the real scene by combining the information in a plurality of initially acquired low resolution digital images that all represent the same scene.

To this end, it is necessary that the initially acquired images (which will be reffered to as the "starting images" herein) should together provide some additional information that could not be obtained from identical images. Certain of the prior art methods operate in the spatial domain (i.e., in the pixel domain), and others in the frequency domain. The latter combine a certain number of low resolution starting images after having transformed them in the spatial frequency domain. After the image in the frequency domain obtained from this combination has been brought back into the spatial domain, it has a better resolution than the starting images. However, the methods operating in the frequency domain call for a very considerable computational effort.

The methods that operate in the spatial domain, on the other hand, use an approach known as "back projection", which is similar to the one utilized, for example, in computer-aided axial tomography (CAT). According to this approach, a two-dimensional object is reconstructed from a series of one-dimensional projections thereof.

The back-projection approach assumes that the low resolution starting images of a real scene represent different projections of a high resolution image that reproduces the real scene. The projection operation is by the same acquisition process, which depends to a large extent on the acquisition device, and is assumed to be known. The problem is thus reduced to reconstructing the high resolution image from its various projections.

In particular, the method used by M. Irani and S. Peleg, described in an article entitled "Super Resolution From Image Sequences" (IEEE, 1990), obtains an iterative reconstruction of the high resolution image by correcting/improving this image in several successive steps. This is done based upon differences between the starting images and images obtained by simulation from the projections of the high resolution image as corrected or improved from time to time (by iteration).

This method has a first drawback in that obtaining high-quality images requires an accurate modelling of the acquisition process (or device) with which the low resolution images have been obtained. For this reason, the above-described approach results in a complicated method that does not lend itself to being implemented in a commercial acquisition device such as a digital still camera.

A second difficulty is that this method requires a considerable number of iterations at each iteration step. This, in turn, may be problematic in devices in which power, processing and data storage resources are at a premium and may effect the commercial success of a product.

SUMMARY OF THE INVENTION

The invention thus provides a method for obtaining high resolution images from a plurality of starting images formed by pixel matrices which are acquired at a lower resolution. As used therein, "high resolution image" is to be understood as referring to an image that is represented on a larger number of pixels than the starting images, irrespective of its resolution.

More particularly, the method of the present invention is for obtaining a high resolution digital image from a plurality of starting images formed by pixel matrices and acquired at a lower resolution. The method may include combining the plurality of starting images to generate a provisional high resolution image formed by a pixel matrix. The method may also include associating a respective error with at least a part of the pixels of the provisional image $HR^{(o)}$.

In addition, this may include providing a first error associated with at least one first pixel, and at least partially processing the provisional image by modifying the pixels of this image based upon the respective errors associated therewith. A second error may also be calculated to associate with at least one second pixel situated in the vicinity of the first pixel in the matrix ($HR^{(o)}$). The second error may be calculated by using the first error associated with the at least one first pixel.

BRIEF DESCRIPTION OF THE DRAWINGS

Further characteristics and advantages of the invention will be understood more clearly with reference to the following detailed description of a preferred embodiment thereof, given by way of non-limiting example, with reference to the attached drawings, in which.

DETAILED DESCRIPTION OF THE PREFERRED EMBODIMENTS

One application of the present invention is for a portable device capable of acquiring digital images and, more particularly, a digital still camera. However, the present invention may be extended to applications other than those explicitly mentioned herein, such as next generation portable and multi-media communication terminals, for example.

Figure 1:
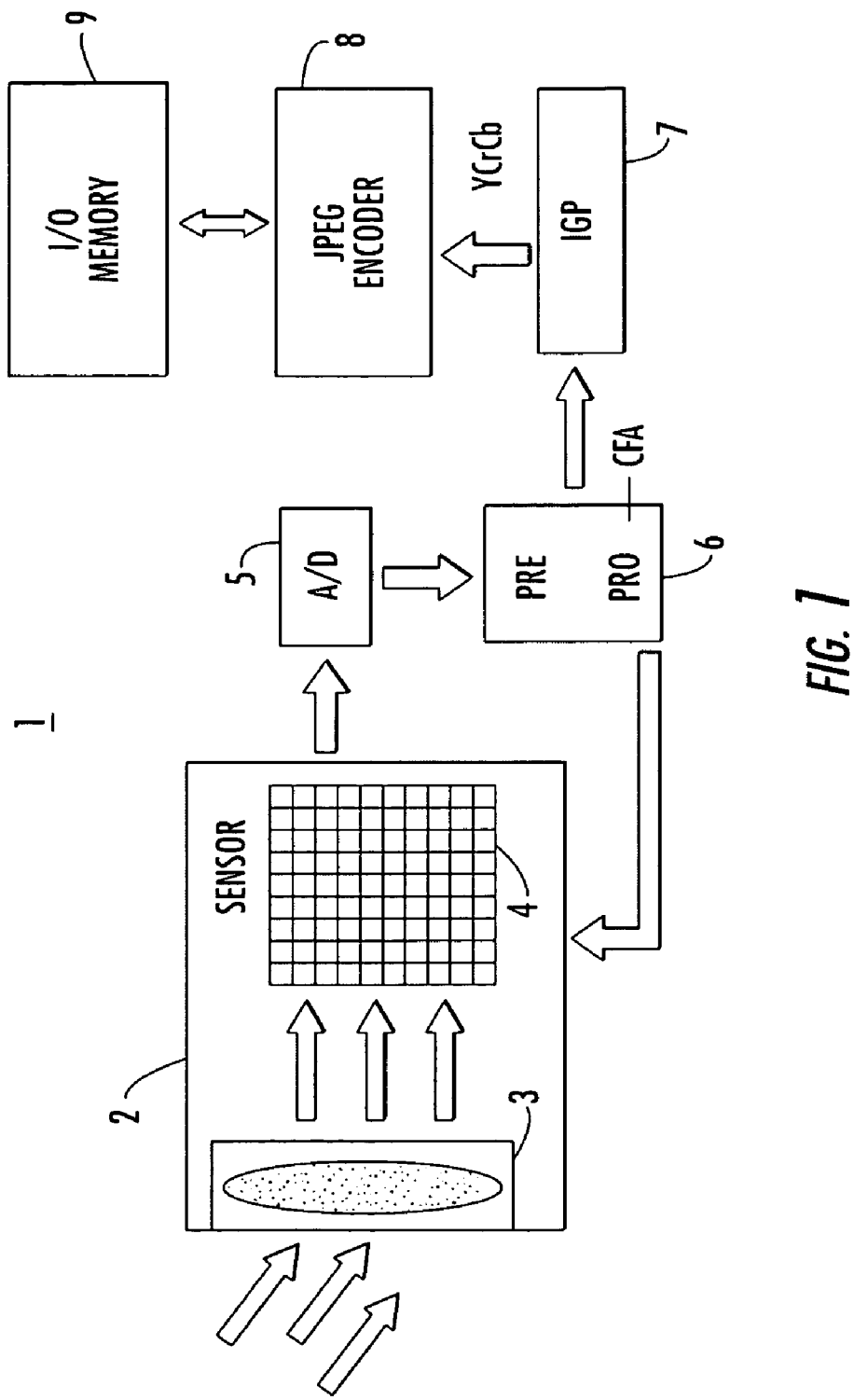
FIG. 1 is a schematic block diagram of an acquisition device which implements a method in accordance with the present invention.
Figure 2:
FIG. 2 is a schematic block diagram illustrating a sensor having filtering elements arranged in a Bayer configuration in accordance with the prior art.

Turning to FIG. 1, a digital still camera 1 includes an acquisition block 2 including an objective with a diaphragm 3 and a sensor 4. The diaphragm 3 focuses the light radiation produced by a real scene onto the sensor 4. The sensor 4, which may be a CCD or CMOS sensor (or other suitable sensor), is an integrated circuit including a matrix of photosensitive cells. Each of the cells generates an electric signal proportional to the quantity of light that strikes it during the acquisition interval. The sensor 4 may include an optical filter with a Bayer matrix, for example.

The still camera 1 also includes an A/D converter 5 for transforming the signal generated by each photosensitive cell into a digital value having a predetermined number of bits (generally 8, 10 or 12 bits). By way of example, the A/D converter 5 may encode the incoming analog signals into digital values represented with 8 bits (although other numbers of bits may also be used). In such case, the digital values of the pixels will be between a minimum binary value equal to 0 and a maximum binary value equal to 255. The digital image output from the A/D converter 5 is in CFA format since it is made up of one chromatic component per pixel. That is, a single 8-bit digital value will be associated with each pixel.

A pre-processing (or PrePro) unit 6 is active before and during the entire acquisition phase. The PrePro unit 6 interacts with the acquisition block 2 to extract from the CFA image a number of parameters useful for carrying out automatic control functions. For example, such parameter may include automatic focusing, automatic exposure, correction of sensor defects, and white balancing.

A image generation pipeline (GP) unit 7 performs a processing phase to obtain a high resolution digital image. In digital still cameras, the unit 7 is commonly implemented in the form of a dedicated processor (CFA processor), possibly in very large scale integration (VLSI) technology.

In particular, the processing phase performed in the IGP unit 7 produces a complete digital image from the incomplete digital starting image, which is in CFA format. The complete digital image is in YcrCb format, for example, in which three digital values (24 bits), namely a luminance component Y and two chrominance components Cr and Cb, are associated with each pixel. This transformation, which may be obtained by interpolation, for example, implies passage from a representation of the image in a single plane (e.g., Bayer plane) that includes the information relating to the different chromatic components to a representation in three planes.

The IGP block 7 may also carry out various functions for improving the image quality. For example, this may include filtering the noise introduced by the sensor 4, as well as the application of special effects and other functions that will generally vary in both number and type from one manufacturer to another.

For the present discussion, it will be assumed that the unit 7 performs the various operations of the present method for obtaining high resolution digital images in accordance with the present invention. In a different embodiment, however, these operations could also be performed in a separate block. The IPG block is followed by an encoder/compression block 8, that is typically of the JPEG type. The compressed image may be saved in a memory unit 9 or sent to an external peripheral unit.

In the present example, the method in accordance with the invention is applied to a plurality of low resolution starting images. These images will hereinafter be referred to as the "starting plurality" or "starting images". According to one particular embodiment of the invention, the starting images are in YCrCb format and include square pixel matrices of a size n×n. For example, the specific case may be considered in which the method in accordance with the present invention produces a final image having a resolution increased up by a factor M in every dimension.

The low resolution starting images are acquired in sequence by the still camera 1 and the acquisition block 2. These starting images are preferably separated from each other only by a short time interval, and with slightly different orientations of the still camera. For example, several images (two or three, for example) may be acquired every time the user releases the shutter.

It should be noted that the micro-oscillations of the still camera 1 between one acquisition and the next, oscillations due to involuntary micro-movements of the user's hand, will be sufficient to generate images that, even when their relative misalignments are minimal, have different information contents. It should also be noted that the starting images acquired in this manner represent the same scene and, being relatively misaligned, reproduce portions of that scene that are different and at least partially superimposed.

Following the acquisition, each of the starting images is converted into digital values by the A/D converter 5 and then processed in the pre-processing block 6. The CFA-format images on the output side of the pre-processing block 6 are then sent to the IGP block 7. In this block each image is subjected to an interpolation phase and is thus transformed into a complete low resolution image in, for example, YCrCb format. The interpolation phase may be carried out, for example, by methodologies known to those skilled in the art and will therefore not be discussed further herein.

The method in accordance with the invention contemplates separate operation on the planes or channels that make up the images. For the sake of simplicity we may here assume that the method operates on the luminance planes Y of the starting images. Hereinafter the term "images" will be used to refer only to the respective luminance components Y. It should be noted that the chrominance planes Cr and Cb may also be subjected to the method in accordance with the invention which is about to be described. However, in certain applications computational savings may be achieved by applying the method only to the luminance plane Y, as this is the component to which the human eye is most sensitive.

The low resolution starting images are subjected to an alignment or registering phase that includes an estimate of the misalignment of the images introduced in the acquisition phase. To this end one of the starting images, possibly the first one acquired, is selected as the reference image. The amount by which the others images are misaligned is then measured with respect to the reference image. The estimate of the misalignment may be obtained by conventional techniques, such "local motion" or "global motion" techniques, for example. The latter are less complex with respect to computational requirements.

For the present example, it will be assumed that the estimate is achieved through a global motion technique. Examples of suitable global motion techniques are described in "Efficient, Robust and Fast Global Motion Estimation for Video Coding" (F. Dufaux, J. Konrad, IEEE Trans. On Image Processing, Vol.9, No.3, March 2000), and in "Robust Global Motion Estimation Using Simplified M-estimator Approach" (A. Smolic, J. R. Ohm, Proc. IEEE ICIP 2000, September 2000), for example. The alignment phase is preferably implemented in a highly precise manner by estimating the misalignments between the images even when they are on the order of fractions of a pixel (i.e., to sub-pixel precision).

Once the relative movement between the low resolution starting images has been defined, these images are combined to generate a first approximation or estimate of the high resolution image. In the present example, this estimate is of a size (n×M)×(n×M), which will hereinafter be referred to as the "provisional high resolution image."

To this end, each starting image is first expanded to a resolution substantially equal to the resolution of the provisional image. In this particular example, the starting images are expanded to a resolution increased by a factor M in every dimension. This expansion is similar to an enlargement, and may be obtained by simply reproducing each pixel in a grid or block of pixels of size M×M. In a possible variant, however, any known intelligent/adaptive enlargement algorithm (e.g., a bicubic algorithm) could be used for the expansion phase.

The expanded starting images are then combined pixel-by-pixel, taking due account of their relative misalignments. In practice, each pixel of the provisional high resolution image is generated by combining "homologous" pixels of the aligned and expanded starting images. In this way each pixel of the provisional high resolution image will be influenced by a plurality of homologous pixel, each of which forms part of one of the starting images. The term "homologous" is herein to be understood as referring to the pixels of the starting images, or analogously of the expanded starting images, that represent or refer to the same elementary portion (receptive field) of the real scene.

Figure 3:
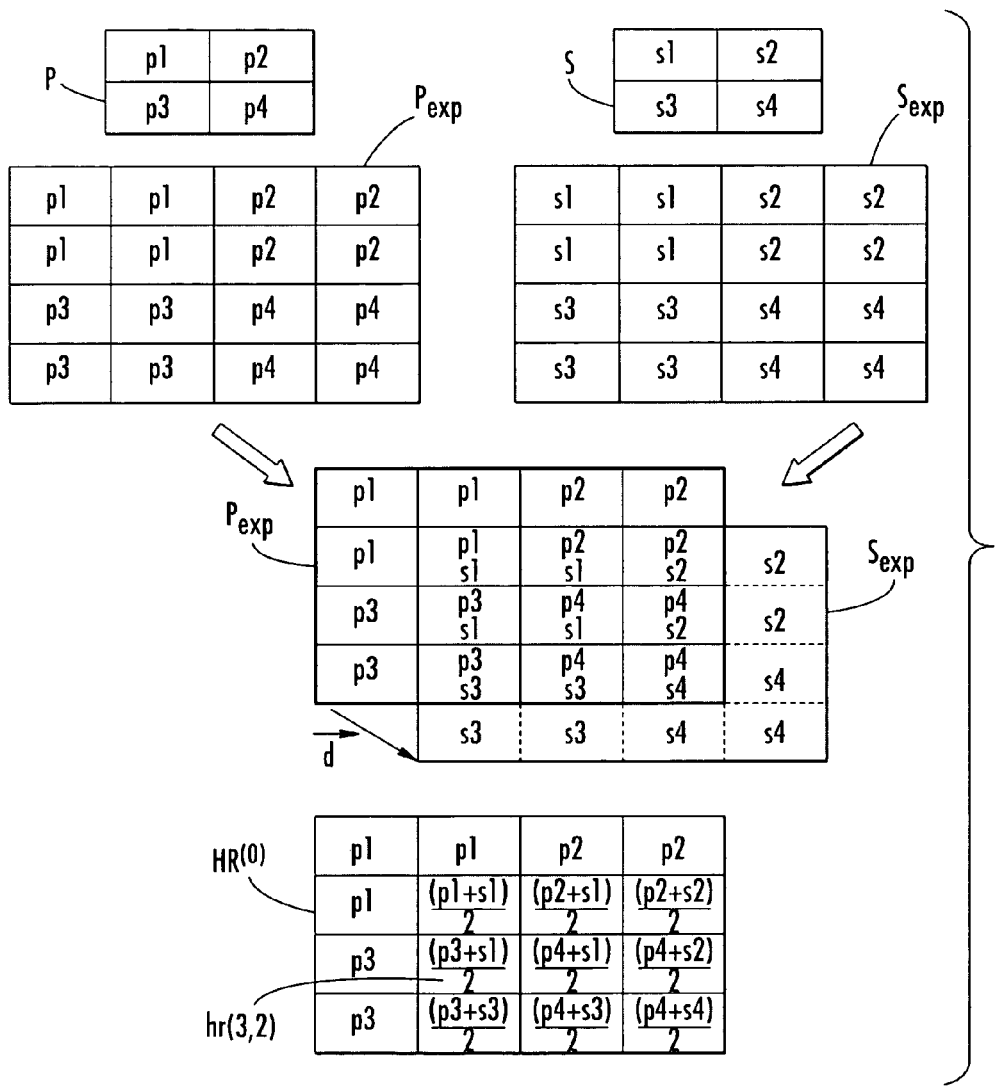
FIGS. 3, 4, 5a and 5b are tables illustrating various steps of a method in accordance with the present invention.

By way of example, FIG. 3 illustrates the process of obtaining a provisional high resolution image $HR^{(0)}$ of size 4×4, starting from the combination of two low resolution starting images of size 2×2. In particular, in FIG. 3 the image $HR^{(0)}$ is obtained from two starting images P and S. Both P and S include four pixels, respectively p1, p2, p3, p4 and s1, s2, s3, s4. A generic pixel (or, more precisely, a digital value of the pixel) of the provisional image $HR^{(0)}$ is be indicated by hr(x,y), where (x,y) represent the space coordinates of the pixel in the matrix.

The two expanded starting images, respectively $P_{exp}$ and $S_{exp}$, correspond to the images P and S after they have been expanded by a factor M=2 in every dimension. As illustratively shown, the expanded starting images $P_{exp}$ and $S_{exp}$ are obtained by reproducing the pixels of the starting images in blocks of size M×M=4 of adjacent pixels. In this way each expanded image includes sixteen pixels.

The expanded images $P_{exp}$ and $S_{exp}$, which are misaligned with respect to each other by a vector $\vec{d}$, are also shown in the illustrated example. The estimate of this vector is obtained in the global motion alignment phase performed preferably on the low resolution starting images P, S. For the purposes of this example, the reference image has been taken to be the image P, and therefore also the expanded image $P_{exp}$.

It should be noted that there may be pixels $S_{exp}$ that are not superimposed on pixels of $P_{exp}$. These pixels refer to portions of the real scene captured by the image S but not by P. Yet, there are also regions of the scene that are captured by pixels of both images.

It should also be noted that the provisional high resolution image $HR^{(o)}$ includes pixels equal to pixels of the reference image $P_{exp}$ in those regions of $P_{exp}$ that are not superimposed on regions of the image $S_{exp}$. It also includes pixels obtained by combining homologous pixels of $P_{exp}$ and $S_{exp}$ in the superimposed regions of $P_{exp}$ and $S_{exp}$.

According to the present example, the combination is a simple operation of arithmetical averaging of homologous pixels. For example, the pixel hr(3,2) of the image $HR^{(o)}$ may be obtained by combining the pixel p3 of the starting image P and the pixel s1 of the starting image S. In this sense, therefore, the pixel hr(3,2) is influenced by the homologous pixels s1 and p3 of the low resolution starting images. The pixels of the starting images not superimposed on pixels of the reference image do not form part of the provisional high resolution image $HR^{(o)}$.

Figure 4:
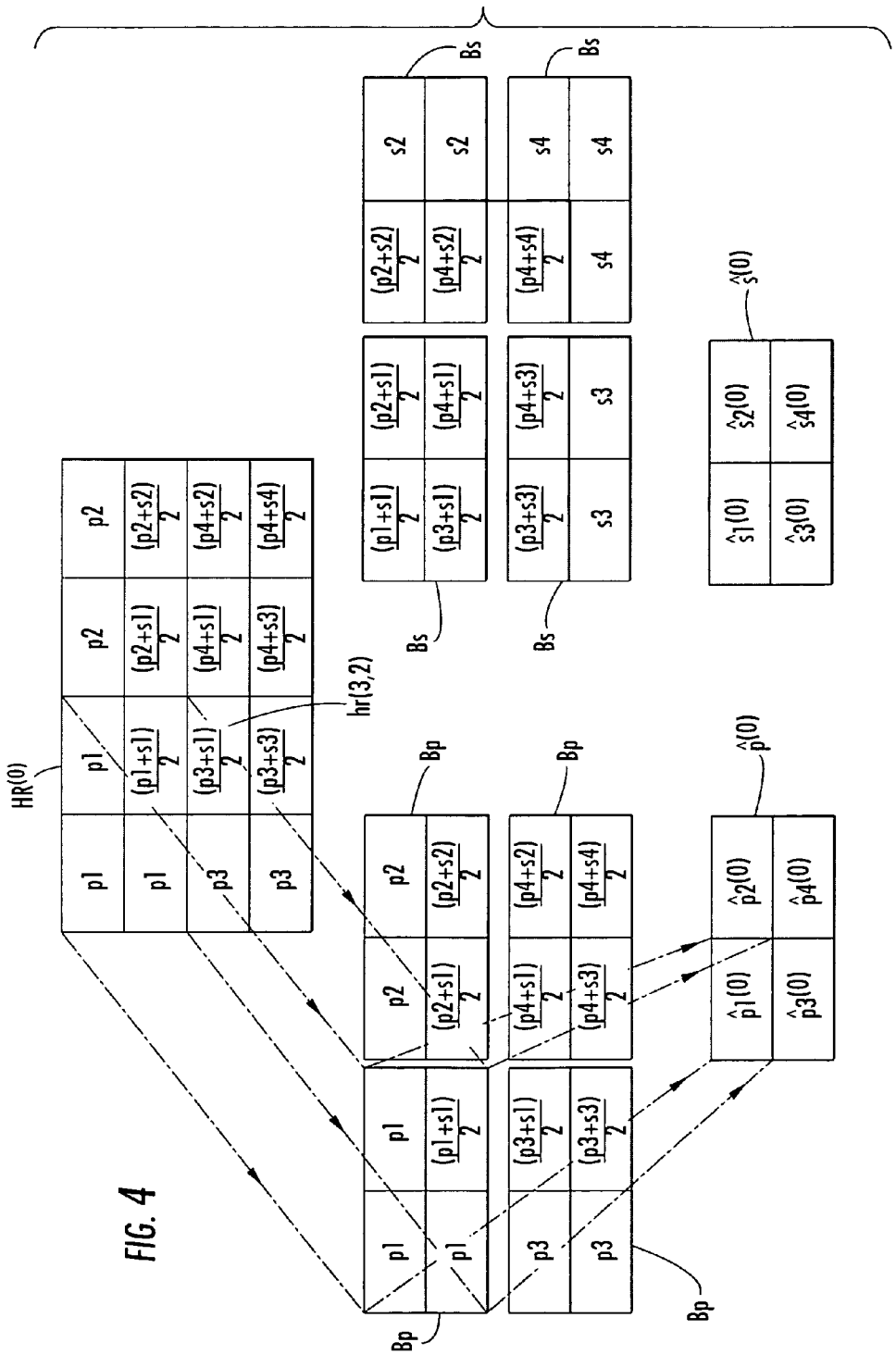

Once the provisional image $HR^{(o)}$ has been obtained, it is projected backwards as required by the back projection technique to produce another plurality of low resolution images. Each of these images corresponds to a respective low resolution image of the starting plurality. This projection is obtained by a simulation of the acquisition process, which in this case is represented by the set of all the operations performed by the still camera 1. This yields an interpolated digital image of the real scene. FIG. 4 shows the provisional image $HR^{(o)}$ and the back-projected low resolution images indicated by, respectively, $\hat{P}^{(o)}$ and $\hat{S}^{(o)}$.

According to the back projection approach, the provisional high resolution image $HR^{(o)}$ is now considered as if it were the real scene, and the simulation of the acquisition process produces further projected low resolution images therefrom. Simulation of the acquisition process requires one to establish a model of this process for use in the processing. This model will preferably be a function that expresses a link between the pixel blocks Bp, Bs of size M×M of the provisional high resolution image $HR^{(o)}$ and individual pixels of the projected low resolution images $\hat{P}^{(o)}$ and $\hat{S}^{(o)}$.

This is effectively in line with what happens in the acquisition process, in which a pixel of a low resolution image captures the information of the real scene or, more precisely, of the portion of the real scene that forms part of its receptive field. For example, from the block Bp including the pixels with digital values p1, p1, p1, (p1+s1)/2 there is generated a pixel in the image $\hat{P}^{(o)}$. Preferably, this model or function makes it possible to produce from a pixel block Bp, Bs (of size M×M) of the provisional high resolution image $HR^{(o)}$ a pixel in each projected image $\hat{P}^{(o)}$, $\hat{S}^{(o)}$ that will be homologous with the one of the starting image P, S that generated this block in the expansion phase.

A model (and potentially a very accurate one) of the acquisition process/device may be determined by of conventional techniques for characterizing the employed components (e.g., objective 3, sensor 4, etc.). Nevertheless, the method in accordance with the invention does not necessarily call for a very accurate model. For example, a model that approximates the acquisition process and has yielded good experimental results is averaging the pixels of the same block M×M of the provisional image $HR^{(o)}$.

In accordance with the present invention, the provisional high resolution image $HR^{(o)}$ is then iteratively processed, i.e., modified at least partly pixel by pixel, to reduce a difference between corresponding images of the starting plurality of images and the plurality of projected images. This processing operation aims at improving the provisional high resolution image at each iterative step and thus obtaining a definitive high resolution image. In particular, the processing of the provisional image $HR^{(o)}$ may be continued to the point where no further improvement will be obtained, or a possible further improvement would not produce any appreciable results.

In a preferred embodiment of the invention, this processing may involve a part of the pixels of the provisional image. This is because it is possible for the provisional image obtained from the combination of the starting images to include regions or pixels that do not need processing/improvement. Consequently, some pixels of this image may not be modified and will therefore appear unchanged (with respect to the provisional image) in the final high resolution image.

For the purpose of selecting the pixels of the provisional image $HR^{(o)}$ to be modified, it is preferable first to associate with each pixel of the provisional image a measure $D_U(x,y)$ that represents its uncertainty. This measure is obtained on the basis of the values of the corresponding (homologous) pixels forming part of the starting images. The regions of the provisional image $HR^{(o)}$ that effectively need improvement are then selected pixel-by-pixel based upon this uncertainty measure.

Following this selection, it is be particularly advantageous to leave unchanged the pixels of the provisional image $HR^{(o)}$ with which there is associated an uncertainty measure $D_U(x,y)$ smaller than a predetermined threshold value T. On the other hand, either all or at least a part of the pixels with which there is associated an uncertainty measure $D_U(x,y)$ equal to or greater than the predetermined threshold value T will be modified as described above.

The measure $D_U(x,y)$ associated with each pixel of the provisional high resolution image and representative of the uncertainty of that pixel can be obtained by statistically characterizing the distribution of the digital values of the homologous pixels of the starting images that, upon being combined, generated the given pixel in the provisional high resolution image $HR^{(o)}$. When a pixel has been generated by combining homologous low resolution pixels having "widely distributed" and therefore very different digital values, the pixel in question will have a large uncertainty measure associated with it. However, in the contrary case a small uncertainty value will be associated with the pixel.

According to a preferred embodiment of the invention, the uncertainty measure $D_U(x,y)$ associated with a pixel hr(x,y) of $HR^{(o)}$ is equal to the difference between the maximum value Max(x,y) and the minimum value Min(x,y) of the values of the homologous pixels forming part of the (expanded) starting images that generated it upon being combined. For example, if each pixel is represented with 8 bits, a pixel hr(x,y) of the provisional high resolution image HR$^{(0)}$ will be left unchanged when:

$$D_U(x,y)=\text{Max}(x,y)-\text{Min}(x,y)<T,$$

where the predetermined threshold value T is preferably equal to about 10 or, better still, equal to about 5.

Experimental results have also shown that a substantial computational savings may be obtained if, over and above the pixels having a small uncertainty value associated therewith, the pixels of the provisional high resolution image HR$^{(0)}$ obtained by combining homologous pixels that are associated with a range of digital values that are not readily perceived by human vision are also left unchanged. These pixels will typically form part of regions that are either highly illuminated (saturation regions) or particularly dark (noisy regions).

For example, if each pixel is represented with 8 bits, a pixel hr(x,y) of the provisional high resolution image HR$^{(0)}$ will be left unchanged when Max(x,y)<S, or when Min(x,y)>L. Preferably, the predetermined threshold value S will substantially lie within the range 5-10 and the predetermined threshold value L will substantially lie within the range 225-230.

These computational optimisations of the processing method for obtaining a high resolution image are preferably performed only once during the first step of the iteration procedure and, more precisely, after or during the phase of obtaining the provisional high resolution image HR$^{(0)}$. Before processing the provisional image HR$^{(0)}$ or, more precisely, before modifying the pixels of this image that are to be improved, an error calculation operation or phase is performed to associate a respective error with at least a part of the pixels of the provisional image HR$^{(0)}$. In particular, the calculation phase provides an error to associate with each of the pixels of this image that are to be improved.

More particularly, the error calculation phase in accordance with the invention makes it possible to associate a respective error of a first type with a part of the pixels that are to be improved. The error is calculated in accordance with conventional techniques of the "back projection" type. For the sake of simplicity errors of this type will hereafter be referred to as the "standard error".

A standard error $e_{s\ tan\ d}$ can be calculated, for example, based upon the differences between corresponding pixels (e.g., the differences between their luminance values) forming part, respectively, of acquired low resolution images and the corresponding projected images. In particular, the error can be calculated for a given pixel of the provisional high resolution image on the basis of the differences between the pixels of the low resolution images (acquired and projected) that influence the given pixel.

Referring to FIGS. 3 and 4, since the pixel hr(3,2) of the provisional high resolution image, for example, is influenced by the pixels p3 and s1 of the low resolution images, the respective standard error to be associated with it can be calculated on the basis of the differences:

$$d_p = p3 - \hat{p}3^{(0)}, \text{ and}$$

$$d_s = s1 - \hat{s}1^{(0)}.$$

For example, the standard error could be obtained from an operation that combines these differences. The combination will preferably be a mean of the absolute values of the differences, or a mean of the squares of these differences. The standard error $e_{s\ tan\ d}(3,2)$ to be associated with, for example, the pixel hr(3,2) of the provisional image HR$^{(0)}$ could be calculated as follows:

$$e_{stand}(3,2) = \frac{|d_p| + |d_p|}{2}.$$

According to the present invention, the error to be associated with a pixel of the provisional image could be a respective error of the standard type or, alternately, an error of a second type, which will hereafter be referred to as the local error $e_{loc}$. Advantageously, the local error $e_{loc}$ may be calculated for a given pixel of the provisional high resolution image by using the errors already calculated and associated with other pixels of the provisional image which are situated in the immediate vicinity of the pixel in question. For example, the local error $e_{loc}$ for a given pixel can be calculated by using the errors already associated with pixels situated in a neighbourhood around this pixel.

More particularly, the local error $e_{loc}$ for a given pixel can be calculated, for example, as the mean of the errors associated with pixels situated in the vicinity of the pixel. According to possible variants of the invention, the local error $e_{loc}$ for a given pixel can be calculated as the largest or the smallest of the errors associated with pixels situated in the vicinity of the pixel.

For example, the pixel matrix of the provisional high resolution image HR$^{(0)}$ and an error matrix E$^{(0)}$ include errors associated with the pixels of the provisional high resolution image HR$^{(0)}$ in the calculation phase are illustrated in FIG. 5. In the error matrix E$^{(0)}$, the errors are arranged in positions corresponding to the pixels of the provisional image with which they are associated.

The error calculation phase may associate the respective errors with the pixels of the provisional image using a systematic scanning of the provisional matrix from left to right and from top to bottom. In the example shown in FIG. 5a, it will be assumed that the calculation phase associates with the pixel hr(1,1) a respective error e(1,1), for example, of the standard type, i.e. $e(1,1)=e_{s\ tan\ d}(1,1)$. Similarly, respective errors $e(1,2)=e_{s\ tan\ d}(1,2)$ and $e(1,3)=e_{s\ tan\ d}(1,3)$ of the standard type will be associated with the pixels hr(1,2) and hr(1,3).

An error is not associated with pixel hr(1,4), because, for example, this pixel does not form part of the set of pixels that are to be improved. The corresponding box of the error matrix E$^{(0)}$ is marked with an X to indicate that it does not include an error value. Thereafter, the calculation phase scans the second row of the provisional matrix HR$^{(0)}$, assigning a respective error of the standard type $e(2,1)=e_{s\ tan\ d}(2,1)$ to the pixel hr(2,1).

With the next pixel hr(2,2), on the other hand, there is associated an error $e(2,2)=e_{loc}(2,2)$ of the local type, i.e. calculated based upon previously calculated adjacent errors. For example, this error may be calculated as the mean of the previously calculated adjacent errors, i.e.:

$$e(2,2) = e_{loc}(2,2) = \frac{e(1,1)+e(1,2)+e(1,3)+e(2,1)}{4} =$$

$$= \frac{e_{stand}(1,1)+e_{stand}(1,2)+e_{stand}(1,3)+e_{stand}(2,1)}{4}.$$

In particular, in this example the error of the local type e(2,2) is calculated by using the previously calculated adjacent errors situated within a neighbourhood having a radius of one pixel around the pixel in question.

Figures 5A, 5B:
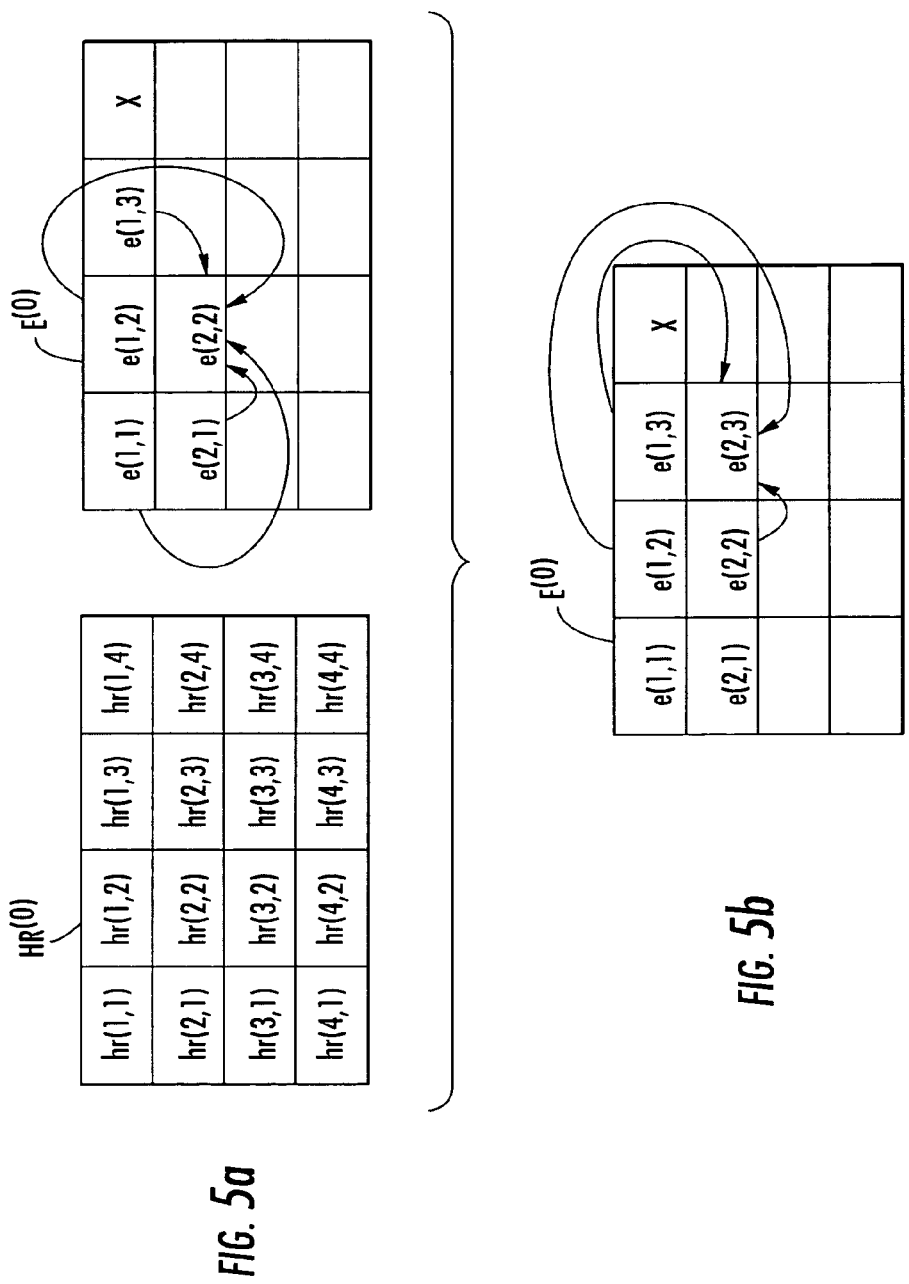

Referring now to FIG. 5b, calculation of the error e(2,2) is followed by calculating an error e(2,3)=$e_{loc}$(2,3) (of the local type) associated with the pixel hr(2,3) and obtained as the following mean:

$$e(2, 3) = e_{loc}(2, 3) = \frac{e(1, 2) + e(1, 3) + e(2, 2)}{3} =$$
$$= \frac{e_{stand}(1, 2) + e_{stand}(1, 3) + e_{loc}(2, 2)}{3}.$$

It should be noted that in this case the error associated with the pixel hr(1,4) does not appear in the mean, because, as noted above, this pixel is not to be improved and therefore does not have an error associated with it. It should also be noted that a local error may be obtained by using previously calculated errors of both the local type and the standard type.

The type of error to be associated with a given pixel may be chosen based upon various criteria that will be readily apparent to one skilled in the art in light of the present description. For example, one could choose to associate an error of the standard type with pixels situated substantially near the edges of the provisional high resolution image (e.g., with the pixels of the first row, the last row, the first column and the last column), and an error of the local type with all the remaining pixels.

Once the error calculation phase has been terminated, the provisional image $HR^{(0)}$ is at least partially processed by modifying the pixels based upon the respective error associated therewith. In one embodiment, for example, each pixel may be modified by adding to it the respective error associated with it. In this way one obtains a provisional high resolution image $HR^{(1)}$ that can be repeatedly projected (generating a respective plurality of improved low resolution images) and improved.

Iterating this improvement/projection process in which the plurality of starting images is not modified, while the further plurality and the provisional image are at least partly modified at each step, one obtains a final high resolution image. As a general rule, the method terminates after a few iterations.

As already mentioned, the processing method terminates when no further improvement can be obtained, or a possible further improvement would not produce any appreciable results. More particularly, with a view to increasing the speed and stability of the method, a pixel of the provisional high resolution image will undergo no further modification, i.e. will be left unchanged in the iteration process, when the error associated with it becomes smaller than a predetermined threshold.

In another possible embodiment, a high resolution pixel will undergo correction/modification in a given iteration step only if the error associated with that pixel and calculated in that particular iteration step is smaller than the error calculated in the previous step, failing which the pixel will be left unchanged in all subsequent iteration steps.

To this end it would be sufficient to keep track of the errors calculated in the previous step by, for example, an appropriate matrix. This matrix could be initialized before commencing the error calculation phase of the first iteration by forcing all its elements to a value equal to the maximum error that could theoretically be incurred. For example, if the method operates on the luminance component Y of the pixels, and if each pixel of the provisional image memorizes the luminance information with 8 bits, the error that could be incurred in the worst case would be equal to the maximum value that could be represented with 8 bits, i.e. 255. In that case, the matrix keeping track of the errors will be initialized by forcing all its elements to 255.

Advantageously, another variant of the method in accordance with the invention could operate so that the pixels for which a standard error is to be calculated and the pixels for which a local error is to be calculated are initially predetermined. For example, an error of the standard type is calculated for the pixels situated near the edges of the provisional image.

With respect to the pixels for which a local error is to be calculated, the procedure at each iteration step, pixel by pixel, may be as follows. For each pixel it is first ascertained whether the respective calculated local error is smaller than the error associated with the given pixel in the previous iteration. If this condition is satisfied, the calculated local error is associated with the pixel. But if the condition is not satisfied, an error of the standard type is calculated for the pixel in question, subsequently ascertaining whether this error is smaller than the error associated with pixel in the previous iteration. If this condition is complied with, the standard error is associated with the pixel, otherwise it is decided that the pixel is not to undergo any further modification.

Experimental results have shown that with the present invention, due to the calculation of an error of the local type, the number of necessary iterations is considerably reduced as compared with a back projection approach of the traditional type. Moreover, the results obtained are also provide desired quality. In particular, the method in accordance with the invention will advantageously require typically no more than two iterations, while an approach of the traditional type may at times require more than five.

This result may be more fully understood by noting that due to the very nature of the acquisition process, the error incurred in the provisional image as compared with the final high resolution image is an error that varies only slowly in the pixel domain, i.e. it remains substantially uniform in the vicinity of a pixel. In this way, using the available information regarding the errors incurred in the vicinity of a pixel, one statistically assures a more reliable error calculation and provides a uniform direction upon the processing/improvement procedure, thus avoiding the process being unduly prolonged by local divergences.

As a result of the valuation of the uncertainty, the solution in accordance with the invention provides a considerable reduction of the number of pixels that have to be corrected/modified at the first iteration. This leads to a significant reduction of the computation cost. The method in accordance with the present invention may thus be advantageously used in applications that call for real-time processing capacities.

It should be noted that the teachings of the present invention regarding the calculation of the local error can be applied to conventional back projection methods that, like the Irani-Peleg method noted above, do not use the criterion of further optimization based upon an uncertainty valuation. Experimental trials have shown that, when the pixels of the provisional image to be modified/improved are selected based upon an uncertainty estimate, the number of pixels that have to be modified/improved in the first iteration will typically be equal to 50% of the total number of pixels. This number decreases exponentially in subsequent iterations.

Figure 6A:
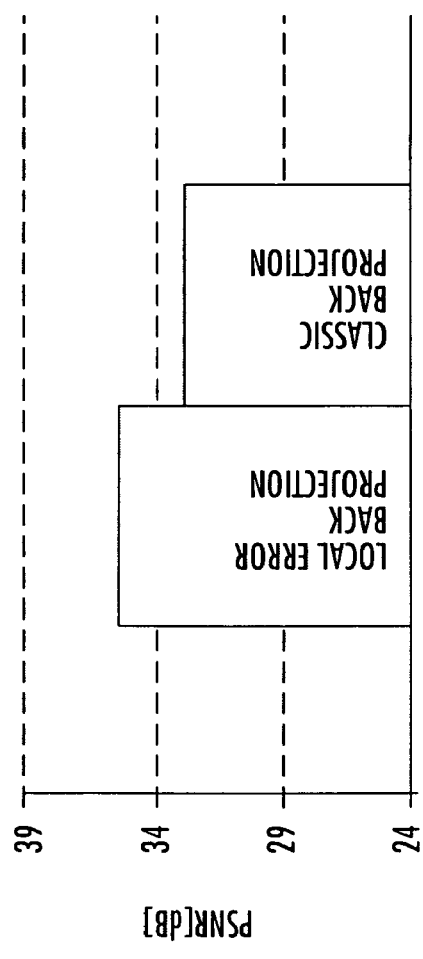
FIGS. 6a and 6b are graphs illustrating the results of experimental tests of a method in accordance with the present invention.
Figure 6B:
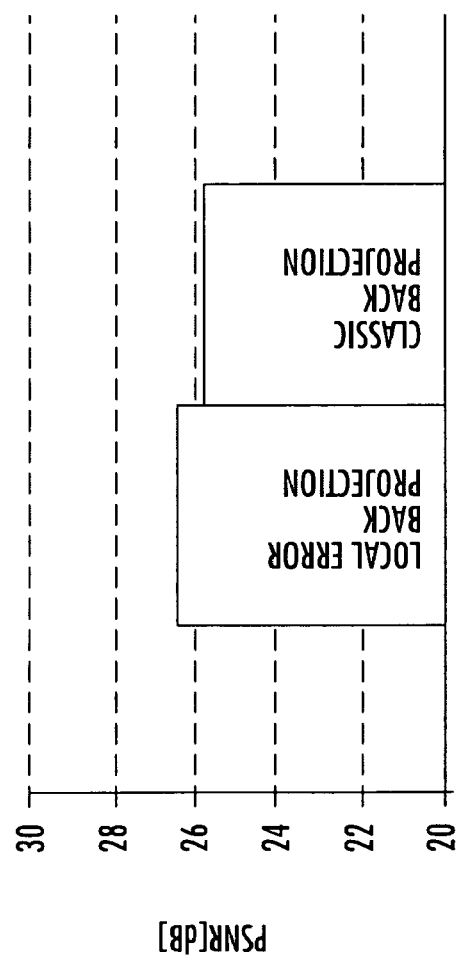

The graphs of FIGS. 6a and 6b refer to the results obtained for, respectively, first and second images that are different from each other. Also, both images have a high spectral content and provide a comparison in terms of quality between the method in accordance with the present invention and the prior art. More particularly, the results obtained in accordance with the present invention are referred to as "local error back projection", and a classic back projection method (i.e., the Irani-Peleg method) is indicated in the figure as "classic back projection".

The results illustrated in FIGS. 6a and 6b are expressed in terms of peak-to-peak signal to noise ratio (PSNR). The PSNR is a standard-type measure and indicates the signal quantity as compared with the introduced noise quantity. It is important to note that, as can readily be seen from the graphs, the method in accordance with the present invention not only calls for a smaller number of iterations and a smaller number of processings in each iteration, but also provides a performance in terms of quality that is superior to what can be obtained by conventional techniques.

In particular, for the image of FIG. 6a the PSNR value obtained by the method of the invention was greater than 35 dB, whereas the conventional method yielded a PSNR of the order of 33 dB. In FIG. 6b, again, the method in accordance with the invention obtained a PSNR value equal to 26.36 dB, while the corresponding PSNR obtained with the conventional method amounted to about 25.87 dB.

These results are in part due to the fact that selecting the pixels to be modified based upon their uncertainty content does not tend to render homogeneous (i.e., "smooth") zones of the image that are relatively certain, and therefore do not have to be processed. As such, the present invention advantageously avoids the introduction of (additional) noise.

Another reason why the present method provides excellent performance as compared to the classic back projection methods is because the latter may only provide desired results if they have at their disposal an accurate model of the acquisition process/device. When they use less accurate models, such as the simple average formation noted above, the classic methods no longer succeed in assuring better performances than the method in accordance with the invention. This aspect is of great importance when one bears in mind that the method in accordance with the present invention is particularly suitable for being implemented in commercial devices, which are usually expected to possess a certain versatility and to be simple in use, characteristics that could not be obtained if the performance were to be critically dependent on the chosen model.

Of course, a person skilled in the art, especially when having to satisfy contingent and specific needs, could introduce numerous modifications and variants into the processing method for obtaining a high resolution digital image as described hereinabove without departing from the scope of the invention recited in the following claims.

That which is claimed is:

1. A method for generating a final digital image from a plurality of starting digital images, each starting digital image comprising a plurality of pixels and having a lower resolution than the final digital image, the method comprising:
    combining the plurality of starting digital images to generate a provisional digital image comprising a plurality of pixels, the provisional digital image having a higher resolution than the starting digital images;
    determining a first error for at least one first pixel of the provisional digital image;
    determining a second error for at least one second pixel of the provisional digital image adjacent the first pixel based upon the first error; and
    processing the at least one first pixel and the at least one second pixel based upon the first and second errors, respectively, to generate the final digital image.

2. The method of claim 1 wherein the at least one first pixel comprises a plurality of first pixels, and wherein determining the first error comprises determining a respective first error for each of the plurality of first pixels.

3. The method of claim 2 wherein determining the second error comprises calculating the second error as an arithmetic mean of the first errors of the plurality of first pixels.

4. The method of claim 2 wherein determining the second error comprises selecting a greatest one of the first errors.

5. The method of claim 2 wherein determining the second error comprises selecting a least one of the first errors.

6. The method of claim 1 further comprising generating a plurality of new digital images based upon the provisional digital image so that changes in the provisional digital image cause corresponding changes in the new digital images, the new digital images having a lower resolution than the final digital image, and each new digital image corresponding to a respective starting digital image; and wherein processing comprises changing the at least one first pixel and the at least one second pixel so that differences between an image characteristic of respective starting and new digital images are reduced.

7. The method of claim 6 wherein determining the first error comprises determining a difference in the image characteristic between at least one corresponding pixel in respective starting and new digital images.

8. The method of claim 6 wherein generating the plurality of new digital images comprises simulating an acquisition process for the plurality of starting digital images.

9. The method of claim 6 wherein generating the plurality of new digital images further comprises averaging pixels of the provisional digital image to generate pixels of the plurality of new digital images.

10. The method of claim 1 further comprising associating respective uncertainty measurements with the pixels of the provisional digital image; and further comprising selecting the at least one first pixel and the at least one second pixel based upon respective uncertainty measurements thereof being above a threshold.

11. The method of claim 10 wherein combining comprises combining values of respective groups of homologous pixels of the starting digital images to form the at least one first pixel and the at least one second pixel; and wherein the first and second uncertainty measurements are based upon the values of the homologous pixels.

12. The method of claim 11 wherein combining values of the homologous pixels comprises averaging the values of the homologous pixels.

13. The method of claim 11 wherein associating comprises statistically characterizing a distribution of the homologous pixels.

14. The method of claim 10 wherein the threshold corresponds to a level of an image characteristic detectable by a human eye.

15. The method of claim 1 wherein the staring digital images correspond to a common scene and have different and at least partially superimposed portions which are out of alignment with respect to one other, and further comprising estimating misalignments of the starting digital images prior to combining.

16. The method of claim 15 wherein estimating comprises estimating using a global motion estimation technique.

17. The method of claim 15 wherein estimating comprises estimating using a local motion estimation technique.

18. The method of claim 1 further comprising increasing a resolution of the starting digital images to be substantially equal to a resolution of the provisional digital image prior to combining.

19. The method of claim 18 wherein increasing the resolution comprises replicating pixels of the plurality of starting digital images.

20. The method of claim 1 wherein the starting digital images are in a YCrCb format comprising a luminance component and at least one chrominance component, and wherein each pixel thereof is associated with a plurality of multi-bit digital values.

21. The method of claim 20 wherein processing comprises processing luminance components of the at least one first and at least one second pixels.

22. The method of claim 1 wherein processing comprises iteratively processing the at least one first pixel and the at least one second pixel to reduce the first and second errors, respectively; and further comprising generating a plurality of new digital images each corresponding to a respective starting image following successive processing iterations of the provisional digital image.

23. The method of claim 22 further comprising updating the first and second errors following successive processing iterations.

24. A method for generating a final digital image from a plurality of starting digital images, each starting digital image comprising a plurality of pixels and having a lower resolution than the final digital image, the method comprising:
combining the plurality of starting digital images to generate a provisional digital image comprising a plurality of pixels, the provisional digital image having a higher resolution than the starting digital images;
generating a plurality of new digital images each corresponding to a respective starting digital image based upon the provisional digital image, the new digital images having a lower resolution than the provisional digital image;
selecting pixels of the provisional digital image having a respective uncertainty value greater than a threshold;
determining a first error for at least one first selected pixel based upon a difference in an image characteristic of corresponding pixels in respective starting and new digital images;
determining a second error for at least one second selected pixel of the provisional digital image adjacent the at least one first selected pixel based upon the first error;
processing the at least one first and second pixels to reduce the first and second errors; and
iteratively repeating the generating, selecting, determining, and processing steps to generate the final digital image.

25. The method of claim 24 wherein the at least one first pixel comprises a plurality of first pixels; wherein determining the first error comprises determining a respective first error for each of the plurality of first pixels; and wherein determining the second error comprises calculating the second error as an arithmetic mean of the first errors of the plurality of first pixels.

26. The method of claim 24 wherein the at least one first pixel comprises a plurality of first pixels; wherein determining the first error comprises determining a respective first error for each of the plurality of first pixels; and wherein determining the second error comprises selecting a greatest one of the first errors.

27. The method of claim 24 wherein the at least one first pixel comprises a plurality of first pixels; wherein determining the first error comprises determining a respective first error for each of the plurality of first pixels; and wherein determining the second error comprises selecting a least one of the first errors.

28. The method of claim 24 wherein generating the plurality of new digital images further comprises averaging pixels of the provisional digital image to generate pixels of the new digital images.

29. The method of claim 24 wherein the uncertainty value of each pixel of the provisional digital image is based upon pixels homologous thereto.

30. The method of claim 24 wherein the threshold corresponds to a level of an image characteristic detectable by a human eye.

31. The method of claim 30 wherein the image characteristic comprises luminance.

32. An acquisition device for generating a final digital image comprising:
a light focusing device and a sensor array for cooperating to capture digital images; and
a processor for controlling said light focusing device an said sensor array to capture a plurality of starting digital images, each starting digital image comprising a plurality of pixels and having a lower resolution than the final digital image;
said processor also for
combining the plurality of starting digital images to generate a provisional digital image comprising a plurality of pixels, the provisional digital image having a higher resolution than the starting digital images,
determining a first error for at least one first pixel of the provisional digital image,
determining a second error for at least one second pixel adjacent the at least one first pixel based upon the first error, and
processing the at least one first pixel and the at least one second pixel based upon the first and second errors, respectively, to generate the final digital image.

33. The acquisition device of claim 32 wherein the at least one first pixel comprises a plurality of first pixels; wherein determining the first error comprises determining a respective first error for each of the plurality of first pixels; and wherein said processor determines the second error by calculating the second error as an arithmetic mean of the first errors of the plurality of first pixels.

34. The acquisition device of claim 32 wherein the at least one first pixel comprises a plurality of first pixels; wherein determining the first error comprises determining a respective first error for each of the plurality of first pixels; and wherein said processor determines the second error by selecting a greatest one of the first errors.

35. The acquisition device of claim 32 wherein the at least one first pixel comprises a plurality of first pixels; wherein determining the first error comprises
determining a respective first error for each of the plurality of first pixels; and wherein said processor determines the second error by selecting a least one of the first errors.

36. The acquisition device of claim 32 wherein said processor further generates a plurality of new digital images based upon the provisional digital image so that changes in the provisional digital image cause corresponding changes in the new digital images, the new digital images having a lower resolution that the provisional digital image, and each new digital image corresponding to a respective starting digital image; and wherein said processor performs the processing by changing the at least one first pixel and the at least one second pixel so that differences between an image characteristic of respective starting and new digital images are reduced.

37. The acquisition device of claim 32 wherein said processor further associates a respective uncertainty measurement with each pixel of the provisional digital image and also selects the at least one first pixel and the at least one second pixel based upon respective uncertainty measurements thereof being above a threshold.

* * * * *

UNITED STATES PATENT AND TRADEMARK OFFICE
CERTIFICATE OF CORRECTION

PATENT NO. : 7,257,275 B2
APPLICATION NO. : 10/457841
DATED : August 14, 2007
INVENTOR(S) : Messina et al.

It is certified that error appears in the above-identified patent and that said Letters Patent is hereby corrected as shown below:

On the title page, items:

(73)  Delete: "(IL)"
Insert: -- (IT) --

(56)  Insert the following under references cited:

-- 6,720,997 * 04/2004 Horie et al.......348/218
6,330,344 * 12/2001 Kondo et al...... 382/107
5,696,848 * 12/1997 Patti et al..........382/254
2004/0027488 * 02/2004 Messina et al.....348/584
2005/0057687 * 03/2005 Irani et al...........348/443 --

Column 2, Line 15  Delete: "avilable"
Insert: -- available --

Column 2, Line 53  Delete: "reffered"
Insert: -- referred --

Column 6, Line 6  Delete: "others"
Insert: -- other --

Column 6, Line 60  Delete: "be"

Column 7, Line 62  Delete: "Preferrably"
Insert: -- Preferably --

Column 8, Line 2  Delete: "by of"
Insert: -- by --

Column 12, Line 29  Delete: "are"

Column 14, Line 11  Delete: "a least"
Insert: -- at least --

UNITED STATES PATENT AND TRADEMARK OFFICE
CERTIFICATE OF CORRECTION

PATENT NO. : 7,257,275 B2
APPLICATION NO. : 10/457841
DATED : August 14, 2007
INVENTOR(S) : Messina et al.

It is certified that error appears in the above-identified patent and that said Letters Patent is hereby corrected as shown below:

| | |
|---|---|
| Column 14, Line 61 | Delete: "other"<br>Insert: -- another -- |
| Column 16, Line 5 | Delete: "a least"<br>Insert: -- at least -- |
| Column 16, Line 24 | Delete: "an"<br>Insert: -- and -- |
| Column 16, Line 62 | Delete: "a least"<br>Insert: -- at least -- |
| Column 17, Line 2 | Delete: "that"<br>Insert: -- than -- |

Signed and Sealed this

Fifteenth Day of December, 2009

David J. Kappos
*Director of the United States Patent and Trademark Office*